No. 872,542. PATENTED DEC. 3, 1907.
A. SHERMAN.
ATTACHMENT FOR PLANTERS.
APPLICATION FILED JULY 27, 1907.
2 SHEETS—SHEET 1.
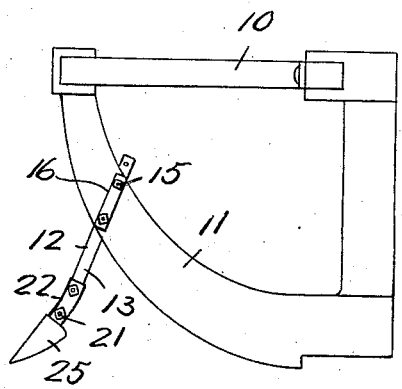
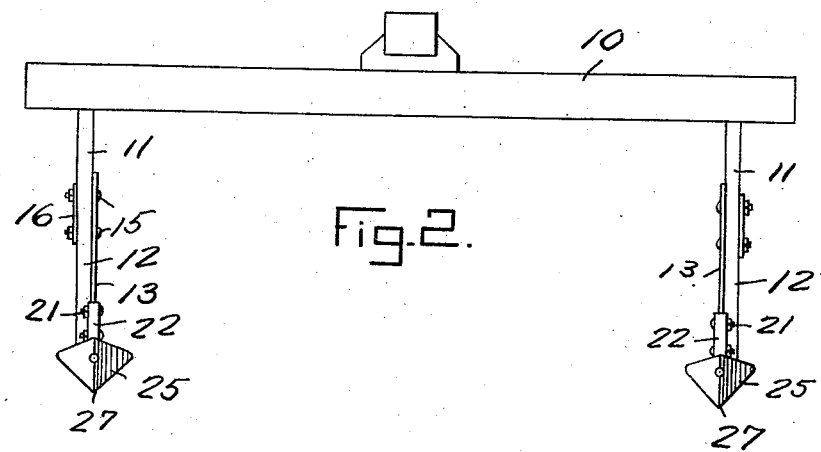
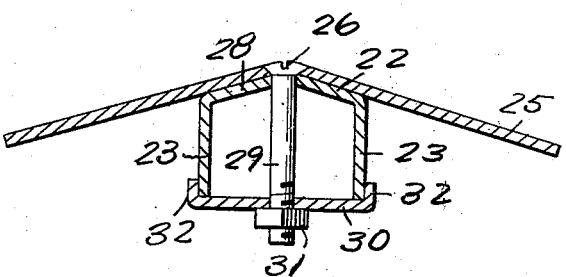
Witnesses
G. R. Thomas
John Bowers
Inventor
Alva Sherman
By Chandler & Chandler
Attorneys No. 872,542. PATENTED DEC. 3, 1907.
A. SHERMAN.
ATTACHMENT FOR PLANTERS.
APPLICATION FILED JULY 27, 1907.
2 SHEETS—SHEET 2.
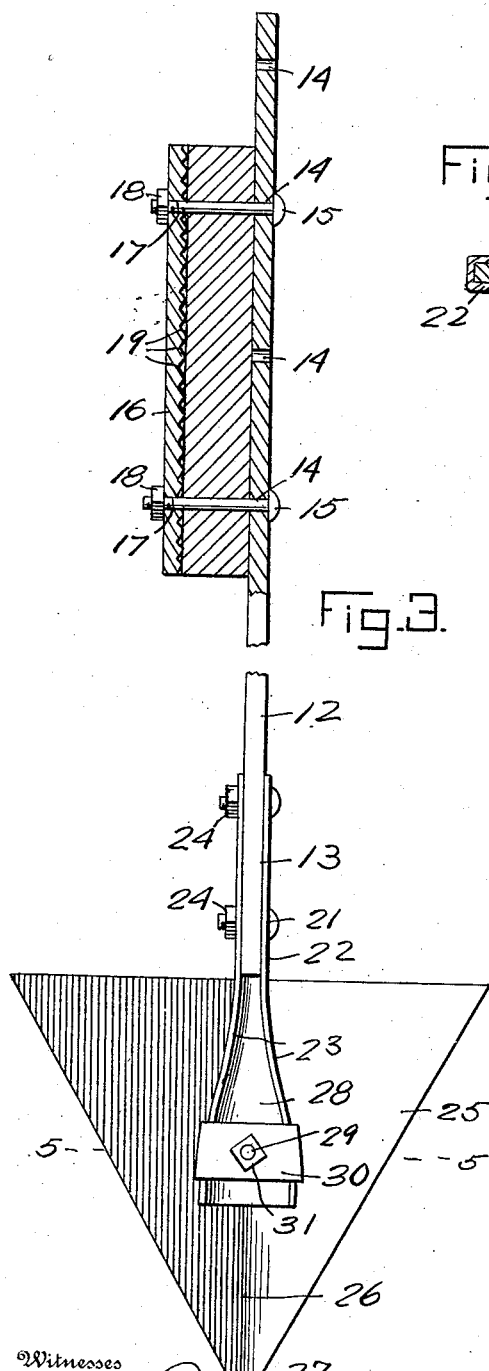
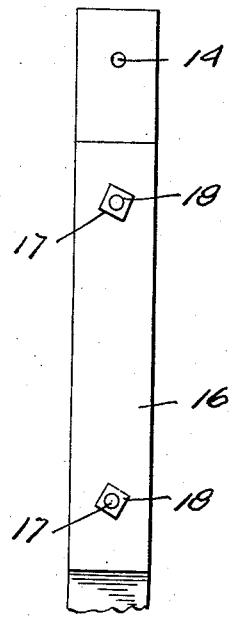
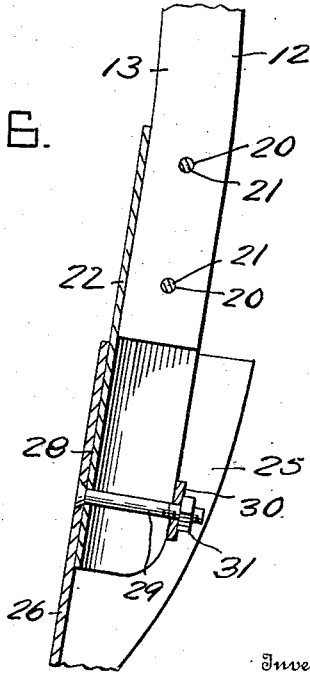
Witnesses
G. R. Thomas
Inventor
Alva Sherman
By Chandler & Chandler
Attorneys

UNITED STATES PATENT OFFICE.

ALVA SHERMAN, OF HOWARD, KANSAS.

ATTACHMENT FOR PLANTERS.

No. 872,542.  Specification of Letters Patent.  Patented Dec. 3, 1907.

Application filed July 27, 1907. Serial No. 385,869.

*To all whom it may concern:*

Be it known that I, ALVA SHERMAN, a citizen of the United States, residing at Howard, in the county of Elk, State of Kansas, have invented certain new and useful Improvements in Attachments for Planters; and I do hereby declare the following to be a full, clear, and exact description of the invention, such as will enable others skilled in the art to which it appertains to make and use the same.

This invention relates to new and useful improvements in lister attachments for planters and in its broad conception it comprehends a standard clamped to the furrow opener and carrying at its lower end an adjustably mounted shovel.

In connection with a device of the above general type, the invention aims as a primary object to provide a novel construction, combination and arrangement of parts, which specifically resides in the manner of assembling the shovel upon the standard and in the relation between said shovel and its adjuncts.

The details of construction will appear in the course of the following description in which reference is had to the accompanying drawings, forming a part of this specification, like characters of reference designating similar parts throughout the several views, wherein:

Figure 1 is a side elevation showing the front part of a standard with the present invention applied to the furrow opener at one side thereof. Fig. 2 is a front elevation of the front part of a planter showing the application of the invention. Fig. 3 is a detailed rear elevation of the attachment *per se*. Fig. 4 is a section taken horizontally through the shank of the shovel. Fig. 5 is a horizontal section on the line 5—5 of Fig. 3. Fig. 6 is a section taken longitudinally through the attachment.

In the accompanying drawings, the numeral 10 designates the front part of a planter of conventional form which includes the furrow openers 11, of usual form.

The attachment forming the subject matter of the present invention is designated generally by the numeral 12, and comprises an elongated standard 13, which, adjacent its upper end is formed with a vertical line of apertures 14. Fastening bolts 15 are passed through selected pairs of the apertures 14 and through the furrow openers 11. A clamping plate 16 coöperates with the bolts 15 and is formed with apertures 17, which surround said bolts, jam nuts 18 being threaded upon the ends of said bolts and bearing against the plate 16. Said plate 16 is formed on its inner face with corrugations 19 to increase its frictional grip. The standard 13 at its lower end, is formed with apertures 20, through which are passed fastening bolts 21 employed as a means for holding a shank 22. The latter is of U shape in cross section and comprises parallel portions 23 which overlie the lower end of the shank 13 and through which the bolts 21 are passed, nuts 24 being threaded upon the ends of said bolts.

The shovel is designated by the numeral 25 and is of substantial triangular form having a central ridge 26 and a pointed working end 27. The portions 23 of the shank 22 extend in diverging relation below the standard 13 towards their lower ends so that the bow shaped part 28 of the shank 22 is of increased thickness at its lower end and fits in the depression in the rear of the shovel, afforded by the rib 26. In such relation said shovel is held fastened to the shank 22 by a bolt 29 which passes through said shovel along the line of the rib 26 and likewise passes through the portion 28 of the shank 22. The bolt 29 carries upon its threaded end, a clamp plate 30 and a nut 31 bearing against said plate. The plate 30 is formed at each side thereof, with flanges 32 which overlie the side portions 23 in their diverging relation.

It will be understood that the attachment may be raised or lowered with relation to the furrow opener 11 by which it is carried to increase its bite in the ground in accordance with the circumstances and conditions of use.

The provision of the shank 22 having the novel construction above described, together with the plate 30 and the nut 29, affords novel means for assembling the shovel 25.

The invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. An attachment of the type set forth, comprising the combination with a stationary part, of a standard, means for clamping said standard to said stationary part, a shank carried at the lower end of said standard, and including side portions, a shovel adapted to be fastened to said shank, a bolt projecting through said shovel and said shank, a plate carried by said bolt and bearing against said side portions and a nut threaded on said bolt and bearing against said plate.

2. An attachment of the type set forth, comprising in combination, a stationary part, a standard, means for clamping said standard to said stationary part, a shank carried at the lower end of said standard, and of U-shape in cross section, said shank including parallel side portions, a shovel adapted to be fastened upon said shank and bearing against the front face thereof, a plate formed at each side thereof with flanges lying against the side portions of said shank, a bolt passing through said shovel, said shank and said plate, and a nut threaded upon the end of said bolt, and bearing against said plate.

In testimony whereof, I affix my signature, in presence of two witnesses.

ALVA SHERMAN.

Witnesses:
J. M. BATSON,
U. D. BURCHFIELD.